United States Patent [19]

Mifune et al.

[11] Patent Number: 4,955,691
[45] Date of Patent: Sep. 11, 1990

[54] OPTICAL PARALLEL PROCESSOR

[75] Inventors: Hironobu Mifune; Toshio Inada; Aki Ueda; Yukio Ogura, all of Yokohama, Japan

[73] Assignee: Ricoh Company, Ltd., Japan

[21] Appl. No.: 367,755

[22] Filed: Jun. 13, 1989

[51] Int. Cl.$^5$ .................. G02B 26/08; G02B 27/42; G02B 27/46

[52] U.S. Cl. .................. 350/162.13; 350/3.64; 350/162.12; 350/162.14

[58] Field of Search .................. 350/162.13, 162.14, 350/6.7, 3.64, 3.66, 3.74, 3.61, 3.63; 364/822; 358/101; 382/42; 355/43

[56] References Cited

U.S. PATENT DOCUMENTS

| | | | |
|---|---|---|---|
| 4,284,324 | 8/1981 | Huignard et al. | 350/3.64 |
| 4,389,093 | 6/1983 | Jackson | 350/162.14 |
| 4,462,046 | 7/1984 | Spight | 350/162.14 |
| 4,832,447 | 5/1989 | Javidi | 350/162.13 |

Primary Examiner—Bruce Y. Arnold
Assistant Examiner—James Phan
Attorney, Agent, or Firm—Mason, Fenwick & Lawrence

[57] ABSTRACT

An optical processing system comprises first light source, a spatial modulator for modulating optical beam passing therethrough, an image input part for writing the input image on the modulator by means of an incoherent optical beam, an optical Fourier transform device, an optical memory for storing a plurality of image informations in a form of Fourier transform hologram comprising a medium which allows erasing and rewriting of information by optical beam, an image detection/light source device supplied with a plurality of optical beams for producing another optical beam in correspondence to one of the optical beams which has the maximum intensity along a path of that optical beam in a reversed direction, a second light source for irradiating the optical memory by another optical beam for writing a new information, an image output device provided in an optical path of the output beam, and a controller connected to the image input device, first light source and second light source for controlling energization thereof, in which the controller is further connected to the modulating means and optical memory means for clearing informations written thereon.

8 Claims, 3 Drawing Sheets

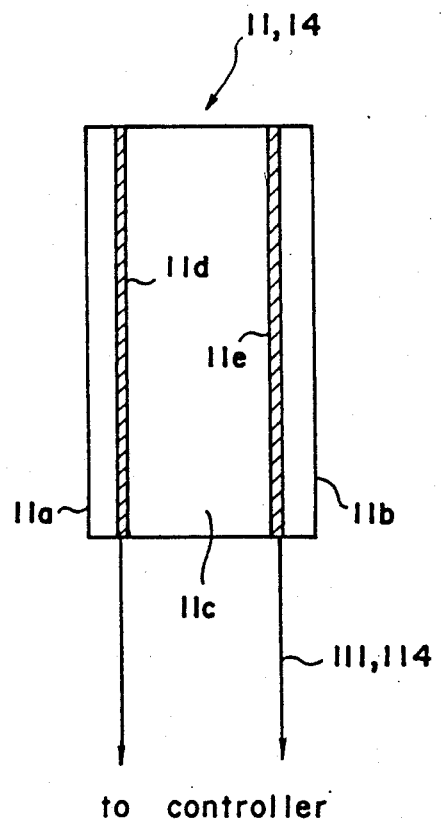
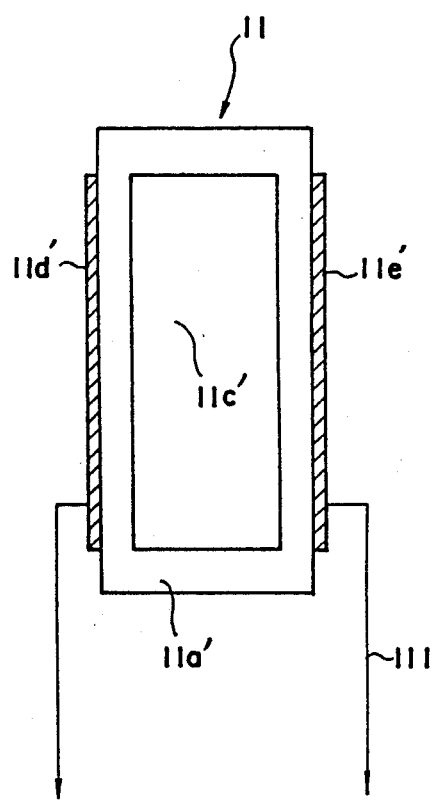
FIG. 2(A)   FIG. 2(B)
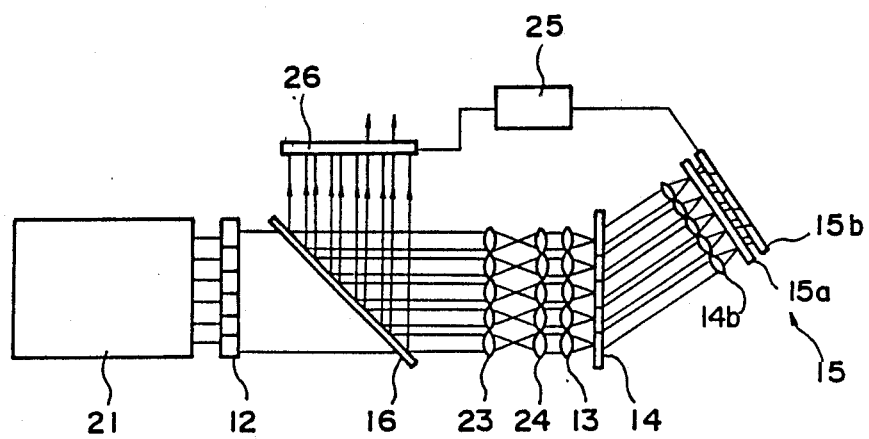
FIG. 5

OPTICAL PARALLEL PROCESSOR

BACKGROUND OF THE INVENTION

The present invention generally relates to optical processors used in the field of image searching and the like and more particularly to an optical parallel processor for obtaining correlation between image informations.

Conventionally, matched filtering technique is known as a technique for obtaining correlation between an input image and images stored in an optical memory. According to this technique, an optical beam carrying an input image is irradiated on an optical memory device which stores a number of images in a form of Fourier transform hologram. Responsive thereto, a diffraction beam indicating a correlation between the input image and the stored image is produced and the correlation between the images is evaluated by detecting this diffraction beam. In this prior art technique, there is a problem in that the hologram used for storage of information cannot be rewritten as the interference pattern is recorded on a photographic film and the like. Further, the material used for the hologram does not allow superposed recording of a large number of informations.

SUMMARY OF THE INVENTION

Accordingly, it is a general object of the present invention to provide a novel and useful optical processing system wherein the aforementioned problems are eliminated.

Another and more specific object of the present invention is to provide an optical processing system for obtaining correlation between an input image and image informations stored in the system wherein a rewritable optical memory device is used for storing image informations.

Another object of the present invention is to provide an optical parallel processing system for processing an input image in parallel by correlating the input image with a plurality of Fourier transform holograms recorded on an optical memory device by using reference light beams having mutually different angles, wherein the optical memory device is constructed to be rewritable. According to the present invention, the informations written in the optical memory device can be rewritten by a simple procedure without changing the arrangement of the optical system.

Another object of the present invention is to provide an optical processing system for parallel processing of an input image wherein the system is divided into a plurality of optical channels and a number of images are stored in an optical memory device as an array in correspondence to the plurality of optical channels in a form of Fourier transform hologram. According to the present invention, one can process a large number of informations without causing mixing up of informations. Further, such a parallel processing divided into a plurality of channels provides a fast operational speed. Furthermore, the use of light eliminates the problem of electronic magnetic interference as in the case of electronic digital processing.

Other objects and further features of the present invention will become apparent from the following detailed description when read in conjunction with attached drawings.

BRIEF DESCRIPTION OF THE DRAWINGS

FIGS. 2(A) and (B) are schematical diagrams showing construction of a spatial modulator used in the system of FIG. 1;

FIG. 5 is a schematical diagram showing a third embodiment of the optical processing system of the present invention.

DETAILED DESCRIPTION

Figure 1:
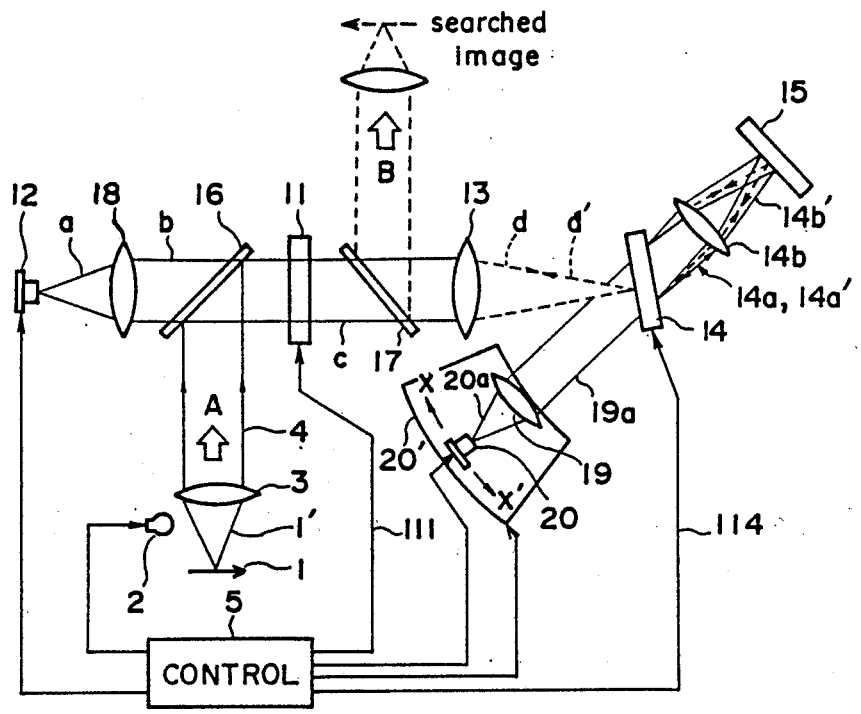
FIG. 1 is a schematical diagram showing a first embodiment of the optical processing system of the present invention.

FIG. 1 shows a first embodiment of the optical processing system of the present invention. Referring to the drawing, an input image 1 is illuminated by a high power optical source 2 such as incandescent lamp under control of a controller 5. Responsive to the illumination, there is produced a light 1' modulated with the information of the image 1, and this light 1' is shaped to a parallel light beam 4 carrying the information of the image 1 after passing through a lens 3. It should be noted that this light beam 4 is an incoherent beam. This light beam 4 is reflected by a semi-transparent or half-mirror 16 and is directed to a spatial modulator 11.

FIG. 2 shows a typical construction of such a spatial modulator 11. Referring to FIG. 2, the spatial modulator 11 comprises a pair of parallel glass plates 11a and 11b for confining a liquid crystal 11c which is a mixture of nematic and cholesteric phase liquid crystals in a normal state in which the spatial modulator is not written with information. In order to align the orientation of the liquid crystal molecule for initialization, a pair of transparent electrodes 11d and 11e are provided at the inner surface of the glass plates 11a and 11b. The electrodes 11d and 11e are connected to the controller 5 via a line 111 and is applied with an initializing voltage before the image is written in the modulator 11 or updated. Responsive to the irradiation of the intense light beam 4, the part of the liquid crystal layer 11c irradiated by the light beam is transformed to the cholesteric phase having random orientation of the liquid crystal molecule. This transformed phase remains even after removal of the light beam 4 and scatters the light passing therethrough. Thus, the image 1 is written into the spatial modulator 11 by the light beam 4.

Alternatively, the spatial modulator 11 may be constructed by using a so-called BSO (bismuth silicon oxide) device as shown in FIG. 2(B). Referring to the drawing, the device comprises a single crystal of bismuth silicon oxide ($B_{12}SiO_{20}$) 11c' having a thickness of several hundred microns. The BSO single crystal 11c' has a major surface directed towards the $<001>$, $<100>$, or $<010>$ direction and is surrounded by a transparent dielectric film 11a' having a thickness of about several microns. This transparent dielectric film carries electrodes 11d' and 11e' connected to the controller 5 via the line 111. When writing an image on such a BSO device, a blue light is used while applying an electrical voltage across the electrodes 11d'' and 11e'. Responsive thereto, the image is written in the form of trapped holes which absorb light. At the time of reading, a red light having a wavelength which does not create holes is irradiated. The light thus passed through the device is modulated according to the image written therein. This BSO device may also be used for the optical memory 14.

After the image 1 is written into the spatial modulator 11, the light source 2 is deenergized and a laser diode 12 is energized under control of the controller 5. Responsive to the energization of the laser diode 12, a coherent laser beam a is produced which is then converted to a parallel beam b by a collimator lens 18 and is passed through the spatial modulator 11. When the beam b passes through the modulator 11, the beam is modulated with the image in the modulator 11 and there is produced a modulated beam c. When the aforementioned BSO device is used for the spatial modulator 11, the light source 2 should produce a red light at the time of the image searching. This beam c is passed through a Fourier transform lens 13 for Fourier transformation, whereby a Fourier image of the image 1 is focused at the focal plane of the lens 13. At the focal plane of the lens 13, an optical memory device 14 recorded with a plurality of Fourier transform holograms of various bodies is disposed. Such a Fourier transform holograms are produced by changing the angle of reference light beam for each of the bodies to be recorded as will be described later. Responsive to the illumination of the Fourier transform holograms by a light beam d exiting from the Fourier transform lens 13, there is reproduced a number of diffraction beams 14a with various angles with respect to the plane of hologram in correspondence to reference light beams which were used at the time of recording of the hologram. Among such a number of diffraction beams, the beam reproduced from the Fourier transform hologram of a body which is the closest to the input image 1 assumes the maximum intensity. In other words, the diffracted beams represent the correlation between the input image and the stored images. It should be noted that the optical memory 14 is constructed similarly to the spatial modulator 11 as shown in FIGS. 2(A) and (B). In other words, the optical memory 14 is rewritable and the Fourier transform hologram written into the optical memory 14 can be erased by applying an initializing voltage from the controller 5 via a line 114 when rewriting the Fourier transform hologram. As the construction of the optical memory 14 is substantially identical to the spatial modulator 11 illustrated in FIG. 2, further description thereof will be omitted.

Figure 3:
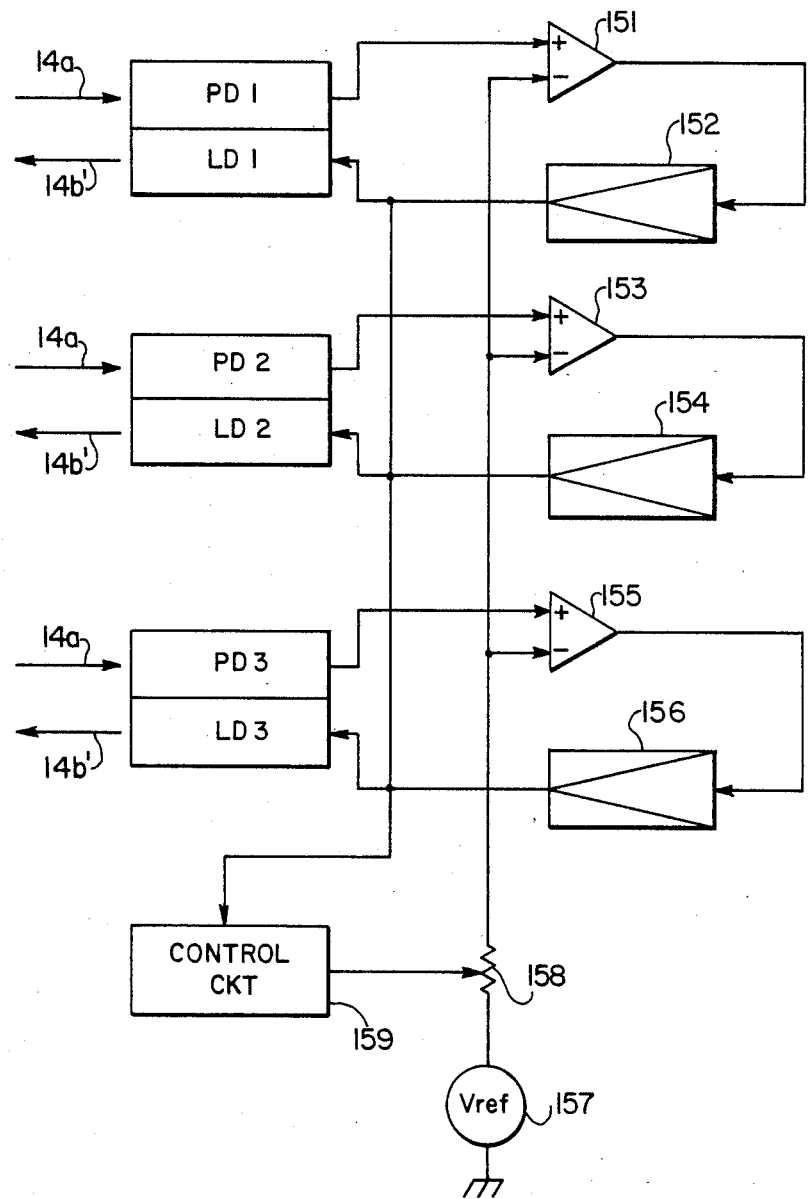
FIG. 3 is a block diagram showing an example of photodetection/laser diode array used in the system of FIG. 1.

The diffracted beams 14a are then passed through a lens 14b and are focused on a detector/source array 15. The detector/source array 15 comprises an array of photodetectors coupled to an array of laser diodes as schematically illustrated in FIG. 3. Referring to FIG. 3, photodetectors PD1, PD2, PD3 . . . forming the photodetector array are connected to corresponding laser diodes LD1, LD2, LD3 forming the laser diode array . . . via respective comparator circuits 151, 153, 155 . . . which energize the laser diodes only when the level of the detected light has exceeded a predetermined threshold which is determined by a reference voltage source 157 and a voltage changing circuit 158 which sweeps the threshold voltage downwards under control of a controlling circuit 159. Further, the control circuit 159 disables the sweeping operation of the circuit 158 when one of the laser diodes is energized. Thus, only the laser diode that is coupled to the photodetector that has detected the strongest beam 14a is energized. It should be noted that the laser diodes are arranged such that the laser beam produced therefrom is directed along a reversed path of the reproduced reference light beam 14a.

The laser beam thus produced is propagated along the reversed path of the diffraction beam 14a after passing through the lens 14b as a beam 14a'. When the beam 14a' is incident to the optical memory 14, it acts as the reference light beam and the image of the body which is closest to the input image is produced as a beam d'. This searched image is passed through the Fourier transform lens 13 and is then outputted after reflection by a half mirror 17 as indicated by an arrow B.

When erasing the image of the body written in the spatial modulator 11, the controller 5 supplies the initializing voltage to the transparent electrodes 11d and 11e of the modulator 11 via the line 111 as already described. Further, the system of the present invention has another laser diode 20 which produces a laser beam 20a under control of the controller 5 as the reference light for recording a new Fourier transform hologram. The laser beam 20a is passed through a lens 19 and is converted to a parallel beam 19a which irradiates the optical memory 14.

When recording a Fourier transform hologram of a new body, the controller 5 energizes the light source 20 and an image of the body is stored in the spatial modulator 11 similarly to the case of searching of the image. When the BSO device is used for the spatial modulator 11, a blue radiation is used for illuminating the input image 1. Next, the laser diode 12 is energized and the Fourier transform of the image of the body stored in the spatial modulator 11 is focused on the optical memory 14. Thus, there is formed the Fourier transform hologram on the optical memory 14 as a result of interference with the reference light 19a. By choosing the intensity of the reference light 19a suitably, one can record the hologram produced as a result of interference on the optical memory 14.

The laser diode 20 and the lens 19 are carried by a movable stage 20' which is movable in an X—X' direction about a center of the optical memory 14 under control of the controller 5. Thus, the angle of the reference light 19a relative to the optical memory 14 is changed by moving the stage 20'. When recording a plurality of Fourier transform holograms of different bodies on the optical memory 14, the angle of the reference light 19a is changed for each of the bodies under control of the controller 5.

As already described, the operation of the optical processing system is controlled by the controller 5. When searching an image, the controller 5 first initializes the spatial modulator 11 such that any previous image is cleared. Next, the controller 5 energizes the lamp 2. In this state, the laser diode 12 is deenergized. After the image is written into the spatial modulator 11, the lamp 2 is deenergized and the laser diode 12 is energized. As a result, the search of the closest image is performed in the system itself automatically without intervention of the controller 5, and the searched image comes out almost instantaneously as shown in the arrow B. Thus, the controller 5 performs only a simple start up operation and can be constructed simply. At the time of recording of the information of the image into the optical memory 14, too, the operation of the controller 5 is simple. Thus, the spatial modulator 11 and the optical memory 14 are cleared, and the input image is written into the spatial modulator 11 by energizing the lamp 2 and deenergizing the laser diode 12. Next, the lamp 2 is deenergized and the laser diode 12 is energized. Further, the angular position of the stage 20' carrying the laser diode 20 is set and the laser diode 20 is energized. By this procedure, the image is stored in the memory 14. When further Fourier transform holograms for other bodies are to be superposed on the optical memory 14, the spatial modulator 11 is cleared, the stage 20' is moved to the next position, and the previous steps of energizing the lamp 2, energizing the laser diode 12 and energizing the laser diode 20 is repeated. Such a step is very simple and can be performed even manually. In such a case, the controller 5 may be a simple switchboard. Of course, the controller 5 may be constructed by a sequence controller or digital computer.

Figure 4:
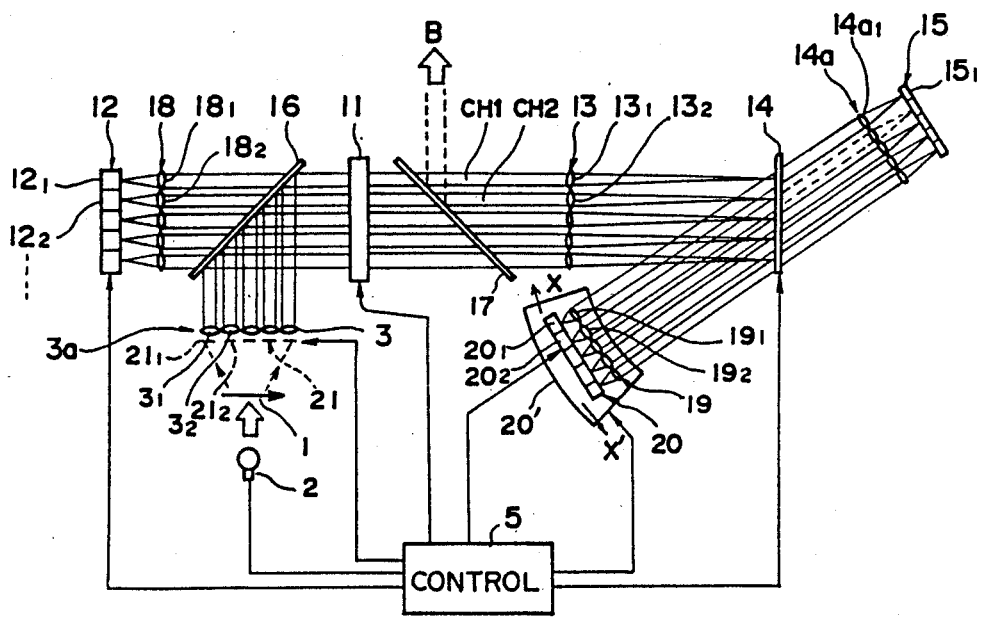
FIG. 4 is a schematical diagram showing a second embodiment of the optical processing system of the present invention.

FIG. 4 shows a second embodiment of the optical processing system of the present invention. In the drawing, these parts constructed identically to those corresponding parts are given identical reference numerals and the description thereof will be omitted.

Referring to FIG. 4, the optical processing system of this embodiment is divided into a plurality of processing channels CH1, CH2, . . . In correspondence thereto, the lens 3, laser diode 12, collimator lens 18, Fourier transform lens 13, lens 14a, and the detector/source array 15 are divided into array of elements corresponding to the channels while the spatial modulator 11 and the optical memory 14 are not divided. Thus, the lens 3 is now constructed by an array of lenses $3_1$, $3_2$, . . . , the laser diode 12 is constructed by an array of laser diodes $12_1$, $12_2$, . . . , the collimator lens 18 is constructed by an array of lenses $18_1$, $18_2$, . . . , the Fourier transform lens 13 is constructed by an array of lenses $13_1$, $13_2$, . . . , the lens 14a is constructed by an array of lenses $14a_1$, $14a_2$, . . . , the detector/source array 15 is constructed by subarrays $15_1$, $15_2$, . . . Further, the laser diode 20 is divided into arrays $20_1$, $20_2$, . . . and the lens 19 is divided into arrays $19_1$, $19_2$, . . . The laser diode array $20_1$, $20_2$, . . . and the lens array $19_1$, $19_2$, . . . are held on the stage 20, similarly to the case of the first embodiment. Each of the elements in the array corresponds to the channel $CH_1$, $CH_2$, . . . in the system. Further, the system has a shutter array 21 comprising an array of shutter elements $21_1$, $21_2$, . . . in correspondence to each of the lens elements $3_1$, $3_2$, . . . of the lens array 3a. The opening and closure of the shutter array 21 is controlled by the controller 5. In the present embodiment, the light source 2 is provided behind the body 21 so as to input a transmitted light to the lens array 3a. However, the illumination of the body 1 is not limited so but the system shown in FIG. 1 may also be used depending on the nature of the input image.

When searching an image from the images stored in the optical memory 14, the body 1 is illuminated by the lamp 2 while all of the shutter elements in the shutter array 21 is opened. Thus, a plurality of identical images of the body 1 is written into the spatial modulator 11 in a form of array corresponding to the channels. Each of the images of the body 1 thus written into the modulator 11 is then focused on the optical memory 14 which stores a number of images of bodies in a form of Fourier transform hologram arranged in a row and column formation in correspondence to the plurality of channels. It should be noted that the construction of the modulator 11 and the optical memory is not arranged in a form of array but is identical to those used in the first embodiment. As the information of the body stored in the optical memory 14 in the form of the Fourier transform hologram is different in each of the elements of the array, only the channel which stores the image corresponding to the input image responds and reproduces the strongest diffraction beam. This diffraction beam is detected by the detector/source array 15 and responsive thereto, the detector/source array 15 selectively produces the beam 14b' similarly to the case of the first embodiment. As a result, the searched image is reproduced as indicated by arrow B similarly to the case of the first embodiment.

When storing the images on the optical memory 14, the controller 5 selectively opens the shutter array 21 and the Fourier transform hologram of the input image is selectively recorded on a part of the optical memory 14 corresponding to one of the channels. The controller 5 further moves the stage 20' carrying the laser diode array 20 and the collimator lens array 19 to a predetermined angular position and energizes one of the laser diodes in the array 20 in correspondence to the channel in which the input image is written. Further, the controller 5 energizes one of the laser diodes in the array 12 in correspondence to the channel and the Fourier transform hologram of the input image is written on the part of the optical memory device 14. By repeating the procedure, a number of images are stored in the optical memory device in row and column formation.

According to the system of the second embodiment, a large number of information can be stored in the optical memory device 14 in contrast to the case of the first embodiment in which only five or six images are stored in a single optical memory device. Further, the searching of the stored image is performed almost instantaneously. It should be noted that five or six images can be stored in each of the channels. Thus, the number of images which can be stored becomes enormous.

FIG. 5 shows another embodiment of the optical processing system of the present invention wherein the laser diode array 12 is controlled by a digital computer 21 used for generating picture. Similarly to the case of the second embodiment, each diode in the diode array 12 corresponds to one of the channels and produces a light beam which is focused on the optical memory device 14 by the lens array 13 performing Fourier transform. The lens systems 23 and 24 shown in FIG. 5 is provided simply to reduce the optical path of the channel and saves the space for the optical processing system. In this embodiment, the detector/source array 15 comprises a half mirror 15a for reflecting back the diffraction beam and a detector array 15b provided behind the half mirror 15a for detecting the intensity of the diffraction beam through the half mirror 15a. The detector array 15b produces an output signal which is supplied to a threshold control circuit 25 for selecting a channel in which the diffraction beam having the maximum intensity is established. Responsive to the result of selection, the control circuit 25 selectively opens a shutter array 26 provided in the output optical path of the system for selectively passing the light beam in the selected channel. In this construction, too, a same image searching can be performed as in the case of the second embodiment. Further, in this embodiment, the image produced by computer and the like can be directly inputted into the system.

Further, the present invention is not limited to these embodiments but various variations and modifications may be made without departing from the scope of the invention.

What is claimed is:
1. An optical processing system comprising:

first light source means for producing a first coherent optical beam;

modulating means written with, an input image for modulating said first coherent optical beam passing therethrough according to the input image, wherein said modulating means comprises a medium for allowing erasing and rewriting of information by a writing optical beam and is provided in an optical path of the first coherent optical beam;

image input means for writing the input image on said modulating means by means of an incoherent optical beam;

optical Fourier transform means provided in an optical path of the first coherent optical beam exited from the modulating means for producing a Fourier transform of the input image on its focal plane;

optical memory means for storing a plurality of image informations in the form of a Fourier transform hologram at the focal plane of said optical Fourier transform means, wherein said optical memory means comprises a medium which allows erasing and rewriting of information by said modulated, first coherent optical beam and produces a number of second coherent optical beams which differ in angle from each other responsive to irradiation of the first coherent optical beam via said optical Fourier transform means;

image detection/light source means for producing a third coherent optical beam in correspondence to the one of the second optical beams which has the maximum intensity along a path of said second coherent optical beam in an approximately reversed direction, said third coherent optical beam producing a fourth coherent optical beam as an output beam upon incidence to the optical memory means such that the fourth coherent optical beam propagates in a direction opposite to that of the first coherent optical beam;

second light source means provided so as to irradiate said optical memory means by a fifth coherent optical beam as a reference light for rewriting the information;

image output means provided in an optical path of the fourth coherent optical beam for directing the fourth coherent optical beam to outside of the system; and a controller connected to said image input means, first light source means and second light source means for controlling energization of said image input means and said first and second light source means, said controller being further connected to said modulating means and optical memory means for clearing information written thereon.

2. An optical processing system as claimed in claim 1 in which said image detection/light source means comprises an array of photodetectors each connected to a corresponding laser diode forming an array of laser diodes in which the laser diodes are arranged such that laser beam produced by each of the laser diode is directed in a reversed path of the second optical beam incident to the corresponding photodetector.

3. An optical processing system as claimed in claim 2 in which said image detection/light source means further comprises a maximum selection circuit connected between the photodetectors and the laser diodes such that only the laser diode corresponding to the photodiode that has detected the strongest second coherent optical beams is energized.

4. An optical processing system as claimed in claim 1 further comprising stage means for supporting said second light source means such that the second light source means is movable about said optical memory means under control of the controller.

5. An optical processing system as claimed in claim 1 in which said modulating means comprises bismuth silicon oxide single crystal which is written with information by a blue light, and said image input means writes the input image in the modulating means by the blue light.

6. An optical processing system as claimed in claim 1 in which said optical processing system is divided into a plurality of optical channels wherein said first light source means comprises an array of laser diodes in correspondence to the plurality of optical channels for producing a plurality of the first coherent optical beams, the image input means comprises an array of lenses in correspondence to the plurality of optical channels for receiving an input image and a half mirror provided in the path of the first coherent optical beams for directing the input image to the plurality of channels, the Fourier transform means comprises an array of Fourier transform lenses provided in correspondence to the plurality of channels, said optical memory means being supplied with said plurality of first coherent optical beams for producing a plurality of the second coherent optical beams in correspondence to the plurality of channels, said image detection/light source means comprises the array of the photodetectors and the laser diodes further arranged in an array in correspondence to the channels for producing the third coherent optical beam in correspondence to one of the second coherent optical beams having a maximum intensity, said optical memory means produces the fourth coherent optical beam responsive to irradiation by said third coherent optical beam, and said second light source means comprises an array of laser diodes in correspondence to the channels for producing a plurality of the fifth coherent optical beams in correspondence to the plurality of channels.

7. An optical processing system as claimed in claim 6 in which said image input means further comprises an array of shutters in correspondence to the lenses forming the array, wherein each of the shutters being controlled by the controller when recording a new image on the optical memory means.

8. An optical processing system as claimed in claim 6 in which said image detection/light source means comprises a half mirror for reflecting back the incident second coherent optical beam as the third coherent optical beam and an array of detectors arranged in correspondence to the plurality of channels, and said image output means comprises a half mirror provided in the path of the fifth coherent optical beam for directing the fifth coherent optical beam to the outside of the system, a shutter array provided so as to interrupt the path of the fifth coherent optical beams directed towards the outside of the system for selectively passing the fifth coherent optical beams, and a shutter controller supplied with output signals from the photodetector array in the image detection/light source means for opening the shutter for the channel in which a large intensity is detected for the second coherent optical beam.

* * * * *